Patented Apr. 4, 1950

2,502,511

UNITED STATES PATENT OFFICE 2,502,511

RESORCINOL ALDEHYDE RESINOUS COMPOSITIONS

Drury Norman Davies and Franz Sam Deutsch, Feltham, England, assignors, by mesne assignments, to British Resin Products Limited, London, England No Drawing. Application March 2, 1946, Serial No. 651,620. In Great Britain April 17, 1945

6 Claims. (Cl. 260—54)

This invention relates to synthetic resins and especially but not solely to resinous adhesives capable of setting at elevated temperatures, or at normal temperatures after the addition of suitable hardening materials, and to methods of producing such resins.

It is well known to use a condensation product of phenol and formaldehyde for this purpose and it has also been proposed to use condensation products or resorcinol and formaldehyde but the commercial development of these products has been hampered by the violence of the reaction which takes place during the condensation, which reaction has hitherto been difficult to control.

It has been proposed to use an excess of resorcinol over formaldehyde during the initial condensation stage, and to harden the product by addition of further formaldehyde, but it has been found that heating must be carefully controlled well below the boiling point of the reactants.

The present invention aims at providing a method which enables the violence of the condensation reaction to be reduced whereby danger is avoided.

According to the invention resorcinol in a substantial quantity of water is reacted at a temperature lying between 60° and 100° C., with formaldehyde in substantially neutral condition, so as to produce an initial condensation product substantially incapable of final hardening at temperatures below 120° C. and this initial condensation product is reacted with a further quantity of formaldehyde to produce a potentially reactive condensation product capable of being hardened by heat alone or at room temperatures by the addition of hardening agents. The resorcinol may be used in the form of a suspension in water. The formaldehyde is preferably used in the form of an aqueous solution neutralised by the addition thereto of an alkaline modium.

The initial condensation product is stable and can be stored if required for short periods before proceeding with the further condensation.

Paraformaldehyde can be used in the process in partial or total substitution of formaldehyde if desired.

The viscosity and curing speed of the potentially reactive product is controllable by suitable variation of refluxing conditions (temperature and time).

The potentially reactive product for application as an adhesive can be stabilised so as to improve its storage life, by various means, such as for example:

(a) By the addition of organic solvents, such as alcohols or esters.
(b) By the addition of phenolic bodies, such as phenols, cresols, or resorcinol.
(c) By the addition of amino bodies, such as urea, thiourea, or melamine.

If the final product is to be used as an adhesive setting at room temperature, hardening can be brought about by the known hardening agents capable of providing further aldehydic groups, such hardening materials being added in known manner immediately before use. The final setting at room temperature can be brought about in the adhesive mixture which may be acid, neutral or alkaline.

In order to improve the joint strength of the adhesive the water added in the original reaction mixture can be wholly or partly removed by vacuum distillation at a suitable stage of the condensation process.

One embodiment of the process of the present invention may be carried out in the following detailed manner:

| | Parts by weight |
|---|---|
| Resorcinol (technical quality) | 100 |
| Water | 35 |
| Formaldehyde solution (40% weight per volume neutralised before use by the addition of sodium sulphite) | 30 |

The resorcinol is liquefied by adding water and applying heat, and the mixture is cooled after uniform mixing has been accomplished. The formaldehyde solution is then added. The temperature is slowly raised to boiling point and is maintained at that point for 1 hour. The mixture is then cooled to 60° C. whilst stirring. 10.5 parts by weight of water are removed by vacuum distillation and 25 parts of formaldehyde (40%) added. The mixture is maintained for further 45 minutes at a temperature of 60° C. and finally cooled to room temperature. The resulting material will be referred to as "resin syrup."

The resin syrup can be used as such as a hot setting adhesive with or without fillers such as wood flour, or stabilised for further storage by addition of for example 6% of industrial methylated spirit (64 o. p.) or 2.5% of phenol, cresol or resorcinol or 4% of urea, (all amounts being parts by weight on the weight of the resin syrup) or of thiourea or melamine.

If setting at room temperature is required, the following adhesive mixes will serve as typical examples:

Example I 100 parts by weight of resin syrup stabilised as (a) above.
20 parts by weight of a finely ground hardener consisting of equal weights of wood flour and paraformaldehyde.
1 to 2 parts by weight of 2-normal paratoluene sulphonic acid solution in water.

Example II 100 parts by weight of resin syrup as above are diluted with 15 parts by weight of water to obtain suitable viscosity and the adhesive is prepared in the following way:

100 parts by weight of diluted resin syrup, and
22 parts by weight of hardener.

The hardener is prepared by grinding together 10 parts by weight of paraformaldehyde
10 parts by weight of wood flour
2 parts by weight of an anhydrous sodium carbonate.

If desired soya flour can be added. Resinous compositions based on the present invention can also be used for moulding by casting, injection, extrusion, or the like.

We claim:

1. A process for the preparation of a thermo-setting resin which comprises mixing resorcinol and water with a neutralised aqueous solution of formaldehyde containing about 40% by weight of formaldehyde per volume of solution, in the ratio of 100 to 35 to 30 parts by weight, slowly heating to the boiling point and maintaining at that temperature for about 1 hour, thereafter adding to the resulting thermo-plastic condensation product, at about 60° C., 25 parts of an aqueous solution of formaldehyde, containing about 40% by weight of formaldehyde per volume of solution and maintaining the mixture at that temperature for about 45 minutes, whereby a thermo-setting condensation product is obtained.

2. A process as claimed in claim 1 wherein all or part of the water initially used is removed by vacuum distillation during the condensation.

3. A process as claimed in claim 1 wherein about 2.5% by weight of a phenolic compound selected from the group consisting of phenol, cresol and resorcinol is added to the thermo-setting condensation product.

4. A process as claimed in claim 2 wherein about 2.5% by weight of a phenolic compound selected from the group consisting of phenol, cresol and resorcinol is added to the thermo-setting condensation product.

5. A process as claimed in claim 1 wherein about 4% by weight of a compound selected from the group consisting of urea, thiourea and melamine is added to the thermo-setting condensation product.

6. A process as claimed in claim 2 wherein about 4% by weight of a compound selected from the group consisting of urea, thiourea and melamine is added to the thermo-setting condensation product.

DRURY NORMAN DAVIES.
FRANZ SAM DEUTSCH.

REFERENCES CITED

The following references are of record in the file of this patent:

UNITED STATES PATENTS

| Number | Name | Date |
|---|---|---|
| 1,849,109 | Novotny | Mar. 15, 1932 |
| 2,385,370 | Norton | Sept. 25, 1945 |
| 2,385,374 | Rhodes | Sept. 25, 1945 |
| 2,398,388 | Norton | Apr. 16, 1946 |
| 2,414,415 | Rhodes | Jan. 14, 1947 |

FOREIGN PATENTS

| Number | Country | Date |
|---|---|---|
| 321,697 | Great Britain | Nov. 18, 1929 |